May 19, 1931.  P. SHAPIRO  1,806,423
LUBRICATOR INDICATOR
Filed April 13, 1927  2 Sheets-Sheet 1
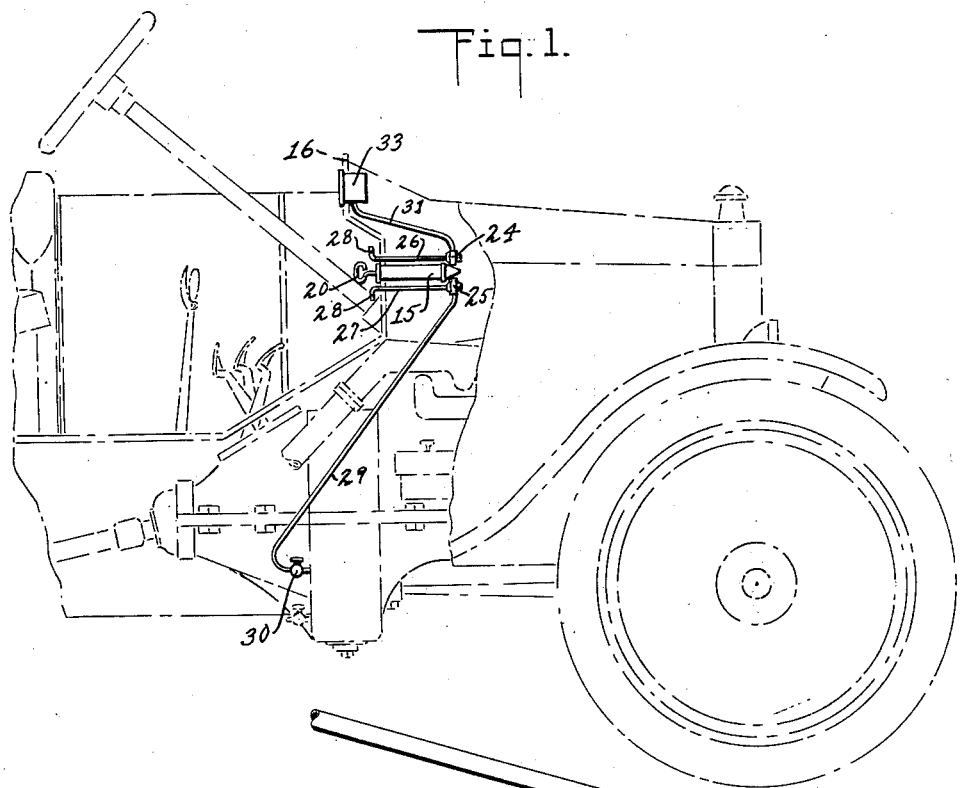
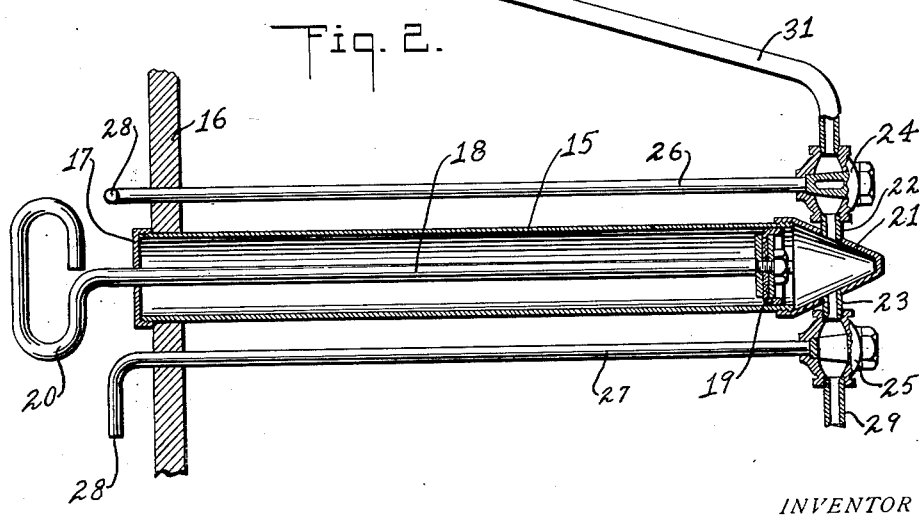
INVENTOR
Philip Shapiro
BY 
ATTORNEY May 19, 1931.  P. SHAPIRO  1,806,423
LUBRICATOR INDICATOR
Filed April 13, 1927   2 Sheets-Sheet 2
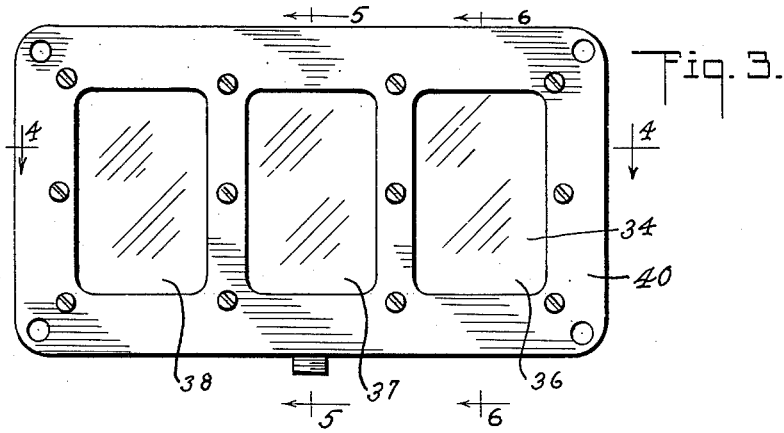
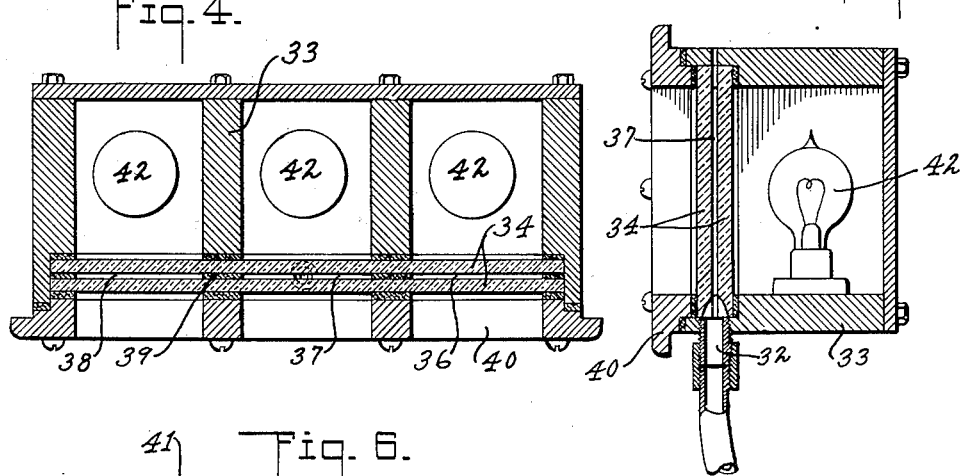
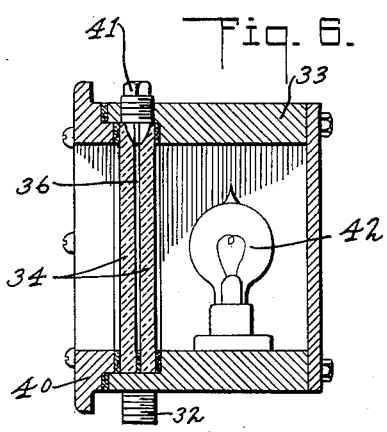
INVENTOR
Philip Shapiro
BY
ATTORNEY.

Patented May 19, 1931

1,806,423

UNITED STATES PATENT OFFICE

PHILIP SHAPIRO, OF LOS ANGELES, CALIFORNIA

LUBRICATOR INDICATOR

Application filed April 13, 1927. Serial No. 183,601.

My invention relates to lubricator indicators particularly adapted, although not necessarily, to motor vehicle engines of that well known type in which oil for lubricating the various parts of the engine is contained in the fly wheel compartment of the crank case.

It is a purpose of my invention to provide a simple, inexpensive and efficient device capable of ready attachment to an engine of the above described character by which a quantity of oil from the crank case can be elevated into view of the operator of the vehicle and displayed in such manner as to permit the operator to readily ascertain the condition of the oil in the crank case and thereby determine if new oil is needed for the proper lubrication of the engine.

It is also a purpose of my invention to provide a lubricator indicator which is associated with one of the crank case drain cocks so that the amount, roughly, of oil contained in the crank case can be determined and thus indicate when an additional supply is required.

I will describe only one form of lubricator indicator embodying my invention, and will then point out the novel features thereof in claims.

In the drawings

Figure 1 is a view showing in side elevation one form of lubricator indicator embodying my invention in applied position to a motor vehicle, the latter being shown in phantom;

Figure 2 is an enlarged vertical sectional view of the oil pumping part of the lubricator indicator shown in Figure 1;

Figure 3 is a view showing in front elevation the oil display device embodied in the lubricator indicator;

Figures 4, 5 and 6 are sectional views taken, respectively, on the lines 4—4, 5—5 and 6—6 of Figure 3.

Referring specifically to the drawings, my invention in its present embodiment comprises a hand operated pump including a barrel 15, with its forward end suitably supported on the dashboard 16 of a motor vehicle. This forward end is closed by a cap 17 provided with a central opening through which extends the rod 18 of a plunger 19, the outer end of the rod being provided with a handle 20 which is disposed to the inner side of the dashboard and within convenient reach of the operator of the vehicle so that he can readily manipulate the pump as required. The opposite end of the barrel 15 is provided with a conical closure member 21 having nozzles 22 and 23 at diametrically opposed points which have threaded connections with petcocks 24 and 25 operable, respectively, by rods 26 and 27 that extend rearwardly through the dash 16, where they are bent to provide handles 28 by which the rods can be turned in one direction or the other to open or close the cocks. The lower cock 25 is connected to the upper end of a pipe 29 which extends downwardly as illustrated in Figure 1, to the upper drain cock 30 of the engine crank case so that when the cock 25 is in open position the conical head 21 of the pump will be placed in communication with the crank case. The cock 24 communicates with a pipe 31 which extends upwardly and rearwardly, with its upper end threadly connected to a connecting sleeve 32, as shown in Figure 5, the sleeve being threaded in a casing 33 of an oil display device.

This oil display device comprises in the present instance a casing 33 being preferably in the form of a rectangle and provided with two transparent panels 34 slightly spaced as shown in Figures 5 and 6 to provide a relatively narrow chamber divided transversely into three compartments 36, 37 and 38 by means of a gasket 39 interposed between the transparent panels 34 and corresponding substantially in form to a frame 40 which is secured to the front side of the casing to maintain the panels 34 in proper position within the casing. The chamber 37 is in communication with the connecting sleeve 32 as illustrated in Figure 5, so that oil forced upwardly through the pipe 31 will be discharged into this compartment. The compartments 36 and 38 are provided with screw plugs 41 through which old oil and new oil, respectively, may be supplied to these chambers, and by virtue of the relatively narrow form of the chambers such oils caused to assume relatively thin films.

At the rear end of the panels 34 a compartment is provided in the casing 33 in which a lamp 42 is positioned so that when illuminated its rays will be projected forwardly through the panels and the films of oil contained therein. This oil display device is preferably positioned upon the instrument board of a motor vehicle so as to be within view of the operator of the vehicle and suitable means (not shown) may be provided for illuminating the lamp 42 when desired.

In practice, the condition of the oil contained in the crank case of the engine can be determined when desired by first opening the cock 25, closing the cock 24 and then operating the plunger 19. By this operation the oil in the crank case will be drawn upwardly through the pipe 29 and into the barrel 15 of the pump. Upon filling of the pump barrel the cock 25 is closed and the cock 24 opened so that upon forward movement of the plunger the body of oil will be ejected therefrom, upwardly through the cock 24, pipe 31 into the chamber 37. Because of the relative narrowness of the chamber 37 the oil will be caused to assume a relatively thin film, and with the lamp 42 illuminated it will be clear that the color of the oil can be readily ascertained. For a more careful determination of the color of the oil the chambers 36 and 38 have been provided, and it will be understood that with these chambers filled with old and new oil respectively that the operator of the vehicle, upon comparing the color of the crank case oil with the new and old oil can accurately determine the condition of the engine oil and thus ascertain whether or not new oil is required.

In the present embodiment of my invention, I have shown the pipe 29 connected to the upper drain cock of the crank case in order that the indicator may also function as a means for indicating approximately the amount of oil contained in the fly wheel compartment of the crank case. It will be understood that the level of oil in the fly wheel compartment must be at or above the upper drain cock before oil can be drawn upwardly through the pipe 29 by the operation of the pump, and if the oil is below this level the operation of the pump will quickly disclose such condition, thereby indicating to the operator of the vehicle that additional oil is required.

Although I have herein shown and described only one form of lubricator indicator embodying my invention, it is to be understood that various changes and modifications may be made therein without departing from the spirit of the invention, and within the spirit and scope of the appended claims.

I claim:

1. A lubricant test device for determining the quality of lubricant in use in a lubricating system, a sight glass for attachment to a support, a conduit for communication with the reservoir of the lubricating system and having one end positioned to discharge on the sight glass, a pump operable to conduct a quantity of lubricant from the reservoir and discharge it over the sight glass to permit inspection thereof, and means coacting with the pump for clearing the sight glass of lubricant deposits.

2. In a lubricant test device for determining the quality of lubricant in the crank case of an internal combustion engine a casing for attachment to a support, a pair of spaced sight glasses therein, a conduit connected with the casing to discharge between the sight glasses and arranged to have communication with the crank case of an internal combustion engine, a pump operable to discharge a film of lubricant between the sight glasses, and means coacting with the pump for removing the lubricant film from the sight glasses at will.

3. A lubricator indicator comprising an oil conduit adapted for connection with an engine crank case to conduct oil therefrom and adapted to extend upwardly to the dash of the vehicle, a device at the upper end of the conduit for receiving oil from the latter and displaying it within view of the operator of the vehicle, and means for forcing oil upwardly of the conduit into the device, said device including chambers in one of which is received the oil from the conduit, another containing a much used oil, and the third containing new oil whereby a comparative test of the crank case oil can be made.

4. A lubricator indicator comprising a pump, a pipe connected to the pump and adapted for connection to the drain cock of a crank case, a second pipe connected to the pump and adapted for connection to an oil display device, and manually operable valves in the pipes by which they may be separately placed in communication with the pump to first draw oil from the crank case and then discharge the oil to the oil display device.

5. A lubricator indicator as embodied in claim 4 wherein the valves are provided with rods by which they may be operated from a remote point.

6. A lubricator indicator comprising a pump including a barrel, a plunger movable in the barrel, petcocks connected to the barrel, an oil display device having a relatively narrow chamber therein for causing oil to enter the chamber to assume a film, a pipe connected to one of the petcocks and in communication with the chamber, and a second pipe connected to the other petcock and adapted for connection with the drain cock of a crank case.

PHILIP SHAPIRO.